United States Patent [19]
Frendt

[11] Patent Number: 6,051,149
[45] Date of Patent: Apr. 18, 2000

[54] COATED BEADS AND PROCESS UTILIZING SUCH BEADS FOR FORMING AN ETCH MASK HAVING A DISCONTINUOUS REGULAR PATTERN

[75] Inventor: Joel M. Frendt, Boise, Id.

[73] Assignee: Micron Technology, Inc., Boise, Id.

[21] Appl. No.: 09/041,829

[22] Filed: Mar. 12, 1998

[51] Int. Cl.[7] .................................................. H01J 9/04
[52] U.S. Cl. ........................... 216/42; 216/11; 216/24; 438/20; 438/739; 438/945; 445/51
[58] Field of Search ............................... 216/11, 24, 42, 216/49, 54, 79, 99; 438/20, 739, 753, 945; 445/50, 51

[56] References Cited

U.S. PATENT DOCUMENTS

| | | | |
|---|---|---|---|
| 4,407,695 | 10/1983 | Deckman et al. | 156/643 |
| 5,198,073 | 3/1993 | Ishibashi | 216/49 |
| 5,220,725 | 6/1993 | Chan et al. | 29/874 |
| 5,242,544 | 9/1993 | Itoh et al. | 216/49 |
| 5,245,309 | 9/1993 | Chan et al. | 313/309 |
| 5,391,259 | 2/1995 | Cathey et al. | 156/643 |
| 5,399,238 | 3/1995 | Kumar | 156/643 |
| 5,510,156 | 4/1996 | Zhao | 427/534 |
| 5,647,999 | 7/1997 | Tada et al. | 216/49 |
| 5,660,570 | 8/1997 | Chan et al. | 439/886 |
| 5,676,853 | 10/1997 | Alwan | 216/11 |

OTHER PUBLICATIONS

Generation of Charged Liquid Cluster Beam of Liquid–Mix Precursors and Application to Nanostructured Materials, Nanostructured Materials, vol. 4, No. 5, pp 597–602, 1994.

*Primary Examiner*—Randy Gulakowski
*Assistant Examiner*—Anita Alanko
*Attorney, Agent, or Firm*—Trask, Britt & Rossa

[57] ABSTRACT

A process for forming an etch mask having a discontinuous regular pattern utilizes beads, each of which has a substantially unetchable core covered by a removable spacer coating. Beads which have a core and a spacer coating are dispensed as a hexagonally-packed monolayer onto a thermo-adhesive layer, which is on a target layer. The beads are kept in place by a bead confinement wall. Following a vibrational step which facilitates hexagonal packing of the beads, the resultant assembly is heated so that the beads adhere to the adhesive layer. Excess beads are then discarded. Spacer shell material is then removed from each of the beads, leaving core etch masks. The core-masked target layer is then plasma etched to form a column of target material directly beneath each core. The cores and any spacer material underneath the cores are removed. The resulting circular island of target material may be used as an etch mask during wet isotropic etching of an underlying layer. Such a combination of plasma etching using the bead cores as a primary mask and a wet etch using the islands formed by the plasma etch as a secondary mask may be used to form micropoint cathode emitter tips in an underlying conductive or semiconductive layer.

27 Claims, 8 Drawing Sheets

COATED BEADS AND PROCESS UTILIZING SUCH BEADS FOR FORMING AN ETCH MASK HAVING A DISCONTINUOUS REGULAR PATTERN

GOVERNMENT RIGHTS

This invention was made with government support under Contract No. DABT 63-97-C-0001 awarded by Advanced Research Projects Agency (ARPA). The Government has certain rights in this invention.

BACKGROUND OF THE INVENTION

1. Field of the Invention

This invention relates to methods for forming etch masks on substrates which are too large to efficiently employ photolithography techniques. Such etch masks may be used to form such structures as micropoint cathode emitters for field emission flat panel video displays, spacers for liquid crystal displays, quantum dots, or other features which may be randomly distributed on a surface.

2. Description of Related Art

For considerably more than half a century, the cathode ray tube (CRT) has been the principal device for electronically displaying visual information. Although CRTs have been endowed during that period with remarkable display characteristics in the areas of color, brightness, contrast and resolution, they have remained relatively bulky and power hungry. The advent of portable computers has created intense demand for displays which are lightweight, compact, and power efficient. Although liquid crystal displays (LCD's) are now used almost universally for laptop computers, contrast is poor in comparison to CRTs, only a limited range of viewing angles is possible, and battery life is still measured in hours rather than days. Power consumption for computers having a color LCD is even greater, and thus, operational times are shorter still, unless a heavier battery pack is incorporated into those machines. In addition, color screens tend to be far more costly than CRTs of equal screen size.

As a result of the drawbacks of liquid crystal display technology, field emission display technology has been receiving increasing attention by industry. Flat panel displays utilizing such technology employ a matrix-addressable array of cold, pointed, field emission cathodes in combination with a luminescent phosphor screen.

Somewhat analogous to a cathode ray tube, individual field emission structures are sometimes referred to as vacuum microelectronic triodes. Each triode has the following elements: a cathode (emitter tip), a grid (also referred to as the gate), and an anode (typically, the phosphor-coated element to which emitted electrons are directed). The cathode and grid elements are generally located on a baseplate, while the anode elements are located on a transparent screen, or faceplate. The baseplate and faceplate are spaced apart from one another. As the space between the baseplate and faceplate must be evacuated, an hermetic seal joins the peripheral edges of the baseplate to those of the faceplate.

Although the phenomenon of field emission was discovered in the 1950's, it has been within only the last ten year. that extensive research and development have been directed at commercializing the technology. As of this date, low-power, high-resolution, high-contrast, monochrome flat panel displays with a diagonal measurement of about 15 centimeters have been manufactured using field emission cathode array technology. Although useful for such applications as viewfinder displays in video cameras, their small size makes them unsuited for use as computer display screens.

Several engineering obstacles must be overcome before large screen field emission video displays become commercially viable. One such problem relates to the formation of load-bearing spacers which are required to maintain physical separation of the baseplate and the phosphor coated faceplate in the presence of external atmospheric pressure. Another problem relates to masking the baseplate in order to form the emitter tips. When the baseplate is no larger than the semiconductor wafers typically used for integrated circuit manufacture, the process disclosed in U.S. Pat. No. 5,391,259 to David Cathey, et al. works splendidly, as the mask particles can be formed from photoresist resin using a conventional photolithography process. However, when the baseplate is larger than those semiconductor wafers, conventional photolithographic techniques utilized in the integrated circuit manufacturing industry are much more difficult to apply. This disclosure is directed toward the problem of forming emitter tips on a large area baseplate.

Eric Knappenberger of Micron Display Technology, Inc. has proposed a new method for forming a mask pattern on a field emission display baseplate using beads or particles as the masking medium. As etch masks for a random pattern of similarly sized dots formed by dispensing glass or plastic beads suspended in a solution on an etchable surface are known to suffer from the problem of aggregation (i.e., multiple beads aggregating together on the surface), a nebulizer or atomizer is used to generate an aerosol containing particles. A monodispersed aerosol may be produced by utilizing a nebulizer or atomizer which produces droplets which are less than twice the size of the beads or particles within the mixture that is to be atomized. Alternatively, the mixture may be diluted so that the probability of two particles or beads being included within a single droplet is small. The aerosol thus created is then applied to a substrate, producing a uniform mono-layer of particles having substantially no aggregation. The particles may be used as a micropoint mask pattern which, when subjected to an etch step, forms field emitter tips for a field emission display or other micro-type structures. An alternative method for minimizing aggregation is to use two types of particles, one of which functions as a masking particle, the other which functions as a spacer particle. Thus, even if aggregation of particles is intentionally generated, the spacer particles may be removed by various techniques such as a chemical dissolution or evaporation, thereby minimizing aggregation of the masking particles themselves.

Another masking technique taught by U.S. Pat. No. 5,676,853 to James J. Alwan, utilizes a mixture of mask particles and spacer particles. The spacer particles space the mask particles apart from one another, and the ratio of spacer particle size to mask particle size and the ratio of spacer particle quantity to mask particle quantity control the distance between mask particles and the uniformity of distribution of mask particles.

An additional masking technique taught by U.S. Pat. No. 5,510,156 to Yang Zhao utilizes latex spheres which are deposited in a monolayer on a surface, shrunk to reduce their diameters, and subsequently covered with an aluminum layer. When the reduced-diameter spheres are dissolved, apertures are formed in the aluminum layer, and the apertures are subsequently utilized to etch an underlying layer.

Still another masking technique is taught by U.S. Pat. No. 5,399,238 to Nalin Kumar. This technique relies on physical vapor deposition to place randomly distributed metal nuclei on a surface. The nuclei form a discontinuous etch mask on the surface of a layer to be etched.

Even under the best of circumstances, the use of the foregoing masking techniques will produce totally random patterns.

A more regular mosaic pattern may be produced by the process disclosed in U.S. Pat. No. 4,407,695 to Harry W. Deckman. Using this process, a monolayer film of spherical colloidal is deposited on a surface to be etched. A spinning step which applies centripetal force to the particles is employed to improve packing density. The packed monolayer is then ion etched to produce tapered columnar features. The tapering of the features results from continuing degradation of the colloidal particles during the ion etch step.

A masking technique similar to that patented by Deckman is disclosed in U.S. Pat. Nos. 5,220,725; 5,245,248 and 5,660,570 to Chung Chan, et al. This technique is disclosed in the context of fabricating an interconnection device having atomically sharp projections which can function as field emitters at voltages compatible with conventional integrated circuit structures. The projections are formed by creating a monolayer of latex microspheres on a surface to be etched by spraying or pouring a colloidal suspension of the microspheres on the surface and, then, subjecting the monolayer covered surface to either a wet etch or a reactive-ion etch.

What is needed is a simplified process for forming more regular mask patterns having no masking defects caused by two or more masking particles being too close to one another. The desired process should be capable of producing mask patterns which suffer little or no degradation during plasma etches. In addition, the process should be capable of forming masks which are usable for both reactive-ion etches and wet etches.

SUMMARY OF THE INVENTION

The heretofore expressed needs are fulfilled by a new process for forming a mask pattern. Beads, each of which has a substantially unetchable core covered by a removable spacer coating are used to form a discontinuous, regular hexagonal mask pattern. Each of the beads is preferably both spherical and of a particular size, as is each of the cores. For a preferred embodiment of the process, a reactive-ion-etchable material layer (hereinafter "the target layer") is coated with a thin thermo-adhesive layer. A bead confinement wall, or frame, is then secured to the peripheral edges of the target layer using one of several available techniques. For example, the confinement wall may be bonded to the thermo-adhesive layer, or it may be secured to the target layer with spring clips. In the former case, the confinement wall may be heated so that when it is placed on the thermo-adhesive layer, it bonds thereto. Beads are then dispensed onto the thermo-adhesive layer, in a quantity at least sufficient to form a hexagonally-packed monolayer on the adhesive layer within the boundaries of the confinement wall. The bead-covered substrate is then subjected to vibration of a frequency and amplitude that will cause a settling of the beads to their lowest energy level, a state where optimum packing is achieved with a hexagonal mono-layer bead pattern in contact with the thermo-adhesive layer.

Optimum hexagonal packing having been achieved, the resultant assembly is heated, causing the layer of beads directly in contact with the adhesive layer to adhere thereto. The beads which are not in contact with the adhesive layer do not adhere to it. The unadhered beads are then discarded. This is accomplished, most easily, by inverting the assembly. They may also be removed by washing them from the assembly, after which the assembly is dried.

Spacer shell material is then removed from each of the beads, leaving only the cores visible in a top plan view. At least two methods may be employed to remove the spacer shell material between the non-etchable bead cores. The bead-coated substrate may be subjected to a first reactive-ion etch which etches away all of the spacer material except that which is beneath the cores and which is in bonded contact with the adhesive layer overlaying the substrate. The first reactive-ion etch chemistry is preferably selected such that it selectively etches the spacer material, but does not significantly etch either the cores or the target layer. If the target layer is etched simultaneously with the spacer material, uneven etching of the target layer will occur, as the areas of the target layer between the beads will etch first. The regions of the target layer closest to the cores will be the last areas exposed to reactive ion bombardment. Alternatively, the spacer material on the beads may be sublimable at elevated temperatures. Thus, as the coating on the beads sublimates, each non-etchable bead core will settle until it is eventually in direct contact with the adhesive layer. The core-masked target layer is then subjected to a second reactive-ion etch, which etches the target layer and forms a column beneath each core. If the target layer is laminar and is etched clear through to an underlying layer, a circular island of target layer material remains beneath each core. The cores are then removed, as well as any remaining spacer material beneath them.

In the case where a laminar target layer is etched clear through to an underlying layer, the circular islands of target layer material that remain may be used as a secondary mask pattern during a wet isotropic etch of the underlying layer. Such a combination of a unidirectional reactive-ion etch using the bead cores as a primary mask and an omnidirectional wet etch using the islands formed by the plasma etch as a secondary mask may be used to form micropoint cathode emitter tips in an underlying conductive or semi-conductive layer.

BRIEF DESCRIPTION OF THE DRAWINGS

The following illustrative figures are not drawn to scale, and are meant to be merely representative of the disclosed process.

PREFERRED EMBODIMENT OF THE INVENTION

Although the masking process of the present invention may be utilized for nearly any masking application where an ordered array of circular features is desired, it is especially useful for the masking of substrates or coated substrates which are so expansive that conventional photolithography exposure equipment will not easily accommodate them. As a concrete example of the utility of the invention, it will be disclosed in the context of a process for fabricating an array of emitter tips for the microcathodes of a base plate assembly for a field emission display.

As a matter of clarification, a brief description of etch technology is in order. An etch that is isotropic is omnidirectional. That is, it etches in all directions at substantially the same rate. As a general rule, solution etches (usually called "wet etches") are isotropic. For example hydrofluoric acid solutions are commonly used to isotropically etch silicon. Although the term anisotropic literally means not isotropic, in the integrated circuit manufacturing industry, it has come to connote substantial unidirectionality. Thus, an etch that is anisotropic etches in substantially a single direction (e.g., straight down). Plasma etches typically have both isotropic and anisotropic components. Plasma etches are normally performed within an etch chamber. A conventional etch chamber generally has an upper electrode and a lower electrode to which the target is affixed. During a plasma etch, ions accelerated by an electric field applied between the two electrodes impact the target. Upon impact, the ions react with atoms on the target surface to form gaseous reaction products which are removed from the etch chamber. It is this acceleration of reactive ions within the electric field that imparts substantial unidirectionality to a plasma etch. The anisotropic component of a plasma etch can be optimized through the careful selection of equipment, etch chemistries, power settings and positioning of the article to be etched within the etch chamber. In the context of this disclosure, the term isotropic means omnidirectional; the term anisotropic means downwardly unidirectional.

The emitter tips will be formed from a silicon layer by, first, creating an array of masking islands on the surface of the silicon layer and, then, performing an isotropic etch to form an emitter tip beneath each masking island. Although the materials utilized in the various layers of the representative process are presently considered to be the preferred materials for the desired application, the inventor wishes to emphasize that the process may be used for the same application, or for other applications, using a different combination of etchable and nonetchable materials.

Figure 1:
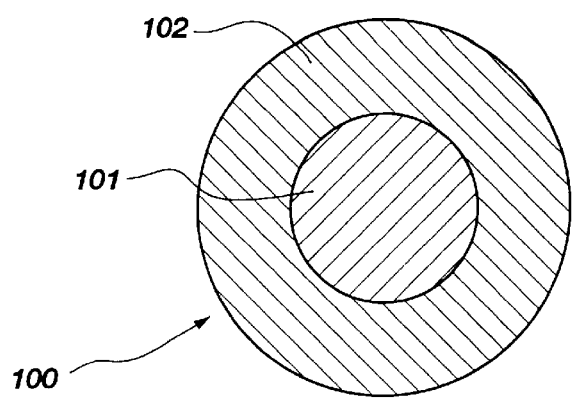
FIG. 1 is a cross-sectional view of a spherical bead having a spherical core covered with a spacer shell.

Referring now to FIG. 1, a spherical bead 100 is depicted in a cross-sectional view. The bead has a spherical core 101 covered with a spacer shell 102. The materials from which the core 101 and the shell 102 are formed are selected such that during a particular anisotropic plasma etch, the material comprising the shell 102 may be etched selectively with respect to the material comprising the core 101. In other words, during the plasma etch, the shell will etch, while the core will not. For example, the bead cores may be formed from glass, iron or many other plasma etch-resistant materials compatible with integrated circuit processing. The shell material, on the other hand, may be formed from polymers, glasses or many other materials which are compatible with integrated circuit processing, and which may be plasma etched selectively with respect to the core material. Alternatively, the shell 102 may be formed from a material that sublimes rapidly at elevated temperatures compatible with integrated circuit manufacture (i.e., those within a range of about 200–400° C. Paradichlorbenzene and napthalene are two such common materials. The bead cores 101 are employed as elemental masking elements, while the shells 102 set or define the spacing between the bead cores 101. Spacing between elemental masking elements (i.e., the cores 101) may be adjusted by varying thickness of the shells 102. In the drawings appended to this disclosure, beads are depicted, for the sake of clarity, as though the cores 101 are opaque elements, while the shells 102 are depicted as though transparent. However, nothing should be inferred regarding the type of materials used from the adoption of this illustration convention.

Figure 2:
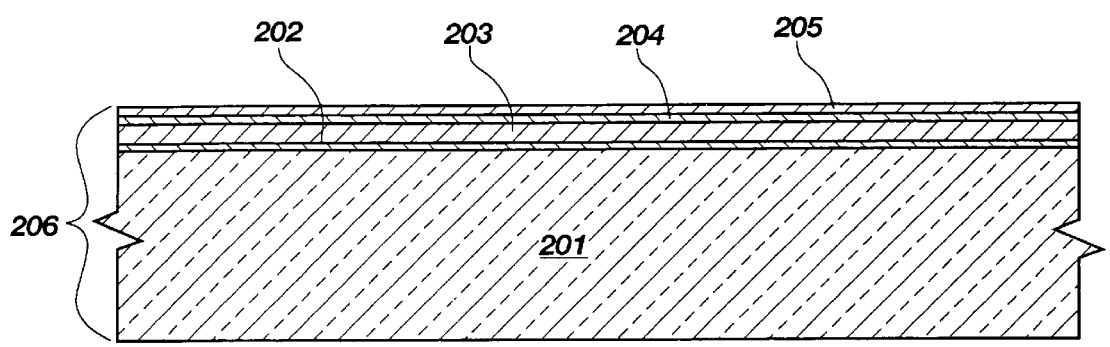
FIG. 2 is a cross-sectional side view of an in-process baseplate assembly, which includes a silicate glass plate, on which has been deposited a conductive layer, a silicon layer, a masking layer, and a thermo-adhesive layer.

Referring now to FIG. 2, a conductive layer 202 is deposited on a silicate glass plate 201. As conductive. layer 202 must be fairly stable during subsequent elevated temperature steps, silicides of metals such as titanium, tungsten, cobalt, nickel, platinum, and paladium may be used. A silicon layer 203 (also referred to herein as "the cathodic layer") is deposited over the conductive layer 202. A masking layer 204 is then deposited over the silicon layer 203. The masking layer 204 may be a nitrided material such as silicon nitride, titanium nitride, or titanium carbonitride, a silicide of a refractory metal such as titanium, platinum or tungsten, or an unreacted metal such as aluminum, titanium, or copper. The primary consideration during the selection of the material for masking layer 204 is that it be substantially unetchable during an anisotropic plasma etch of silicon layer 203. Finally, a thermo-adhesive layer 205 is deposited on the upper surface of masking layer 204. The thermo-adhesive to layer 205 may be a wax or a polymer material which softens and becomes tacky when heated, and which preferably reversibly hardens when cooled. The wax may be, for example, an ester, a fatty acid, a long-chain alcohol, or a long-chain hydrocarbon. The polymer material may be, for example, a polyurethane resin, a polyester resin, or an epoxy resin. The silicate glass plate 201 with the additional layers deposited thereon shall now be referred to as the in-process baseplate assembly 206.

Figure 3A:
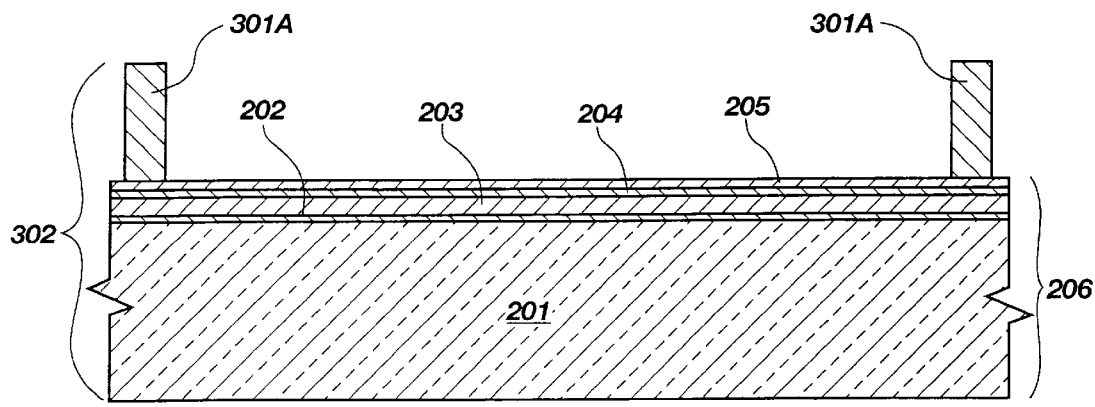
FIG. 3A is a cross-sectional view of the in-process baseplate assembly of FIG. 2 following the affixing of a confinement wall to the periphery thereof.

Referring now to FIG. 3A, a bead confinement wall 301A is attached to the periphery of the thermo-adhesive layer 203 of the in-pocess baseplate assembly 206. The wall 301A may be formed from nearly any rigid or semi-rigid material such as metal, glass, or high-temperature polymeric plastic. The wall 301A may be attached by heating it to a temperature in excess of that which will cause the thermo-adhesive layer 203 to soften and become tacky, placing it on the thermo-adhesive layer 203, and allowing the entire in-process baseplate/wall assembly 302 to cool. Alternatively, the wall 301 may be attached by placing it on the thermo-adhesive layer 203, heating the resulting in-process baseplate/wall assembly 302 to a temperature in excess of that which will cause the thermo-adhesive layer 203 to soften and become tacky, and allowing the entire assembly to cool.

Figure 3B:
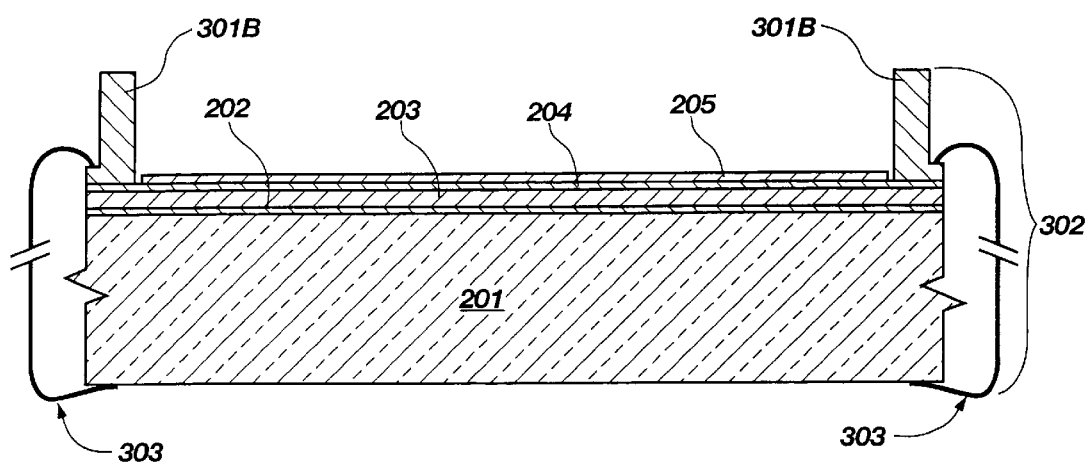
FIG. 3B is a cross-sectional side view of an alternative structure for affixing the confinement wall to the substrate structure of FIG. 2 using spring clips.

FIG. 3B depicts an alternative method of affixing the confinement wall to the in-process baseplate assembly 206. A bead confinement wall 301A is clipped to the substrate assembly 206 with spring clips 303. For the sake of simplification, and because the method by which the bead confinement wall (301A or 301B) is attached to the in-process baseplate assembly 206 insignificantly affects the remainder of the process, the in-process baseplate/wall assembly of FIG. 3B and that of FIG. 3A shall both be referred to, hereinafter, as item number 302.

Figure 4:
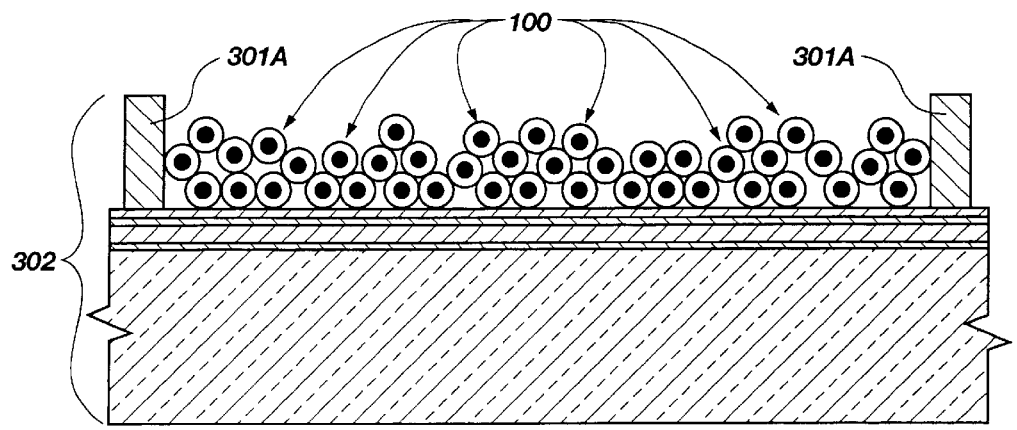
FIG. 4 is a cross-sectional side view of the in-process baseplate assembly structure of FIG. 3A following the dispensing of beads within the boundaries of the confinement wall.

Referring now to FIG. 4, a quantity of beads 100, such as those depicted in FIG. 1, have been dispensed onto the in-process baseplate assembly 302 of FIG. 3A or FIG. 3B. The quantity of the dispensed beads 100 is at least sufficient to create a hexagonally-packed mono-layer of beads 100 on the entire surface of the thermo-adhesive layer enclosed by the confinement wall 301A or 301B. Confinement wall 301A or 301B prevents the dispensed beads 100 from rolling off the edge of the in-process baseplate assembly 206.

Figure 5:
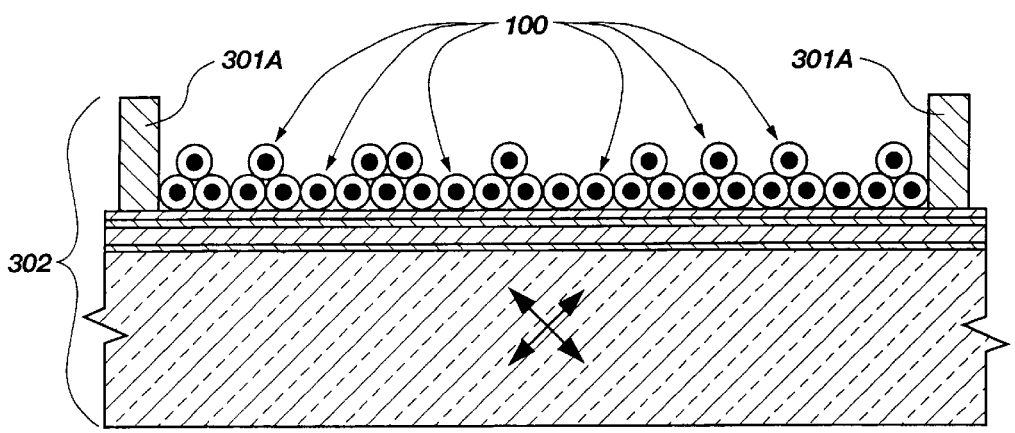
FIG. 5 is a cross-sectional side view of the in-process baseplate assembly of FIG. 4 during a vibrational step which promotes continuous, even hexagonal packing pattern of a mono-layer of beads on the surface of the thermo-adhesive layer.
Figure 6:
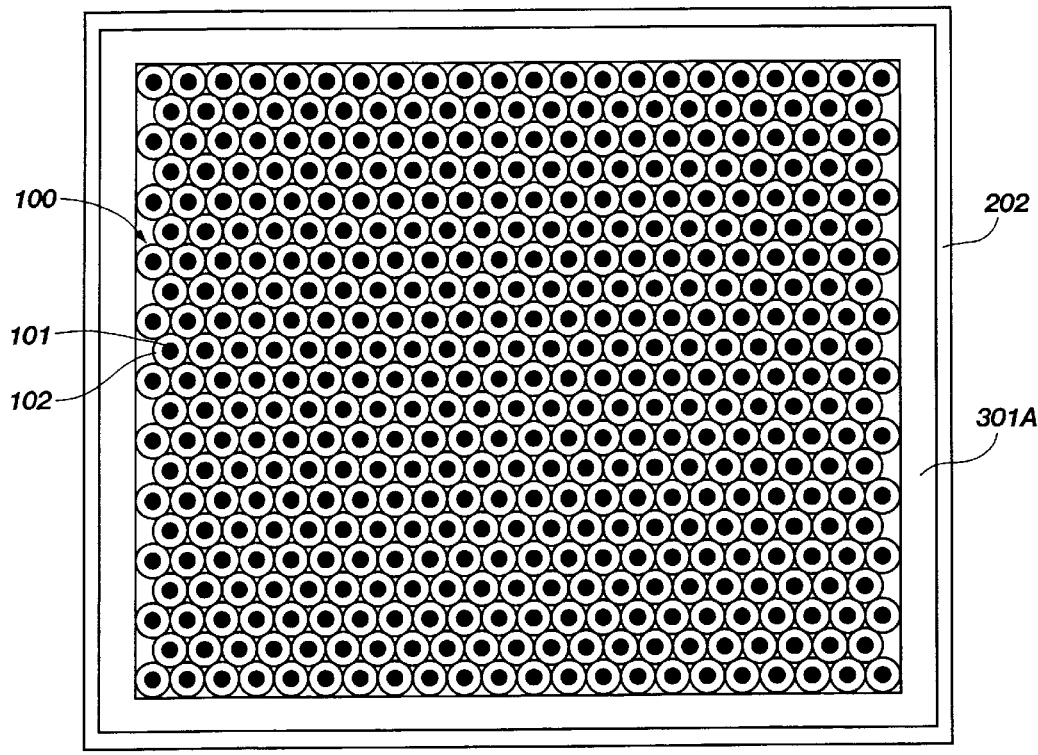
FIG. 6 is a top plan view of an ideal arrangement of hexagonally-packed beads.

Referring now to FIG. 5, a vibration step is performed which promotes continuous, even hexagonal packing pattern of a mono-layer of beads 100 on the surface of the thermo-adhesive layer 203. Ideally, the vibrational movement will include a vertical component that is just barely sufficient to dislodge improperly-packed beads, but not those which are already properly packed in the bottom-most layer. FIG. 6 depicts an ideal arrangemrent of hexagonally-packed beads.

Figure 7:
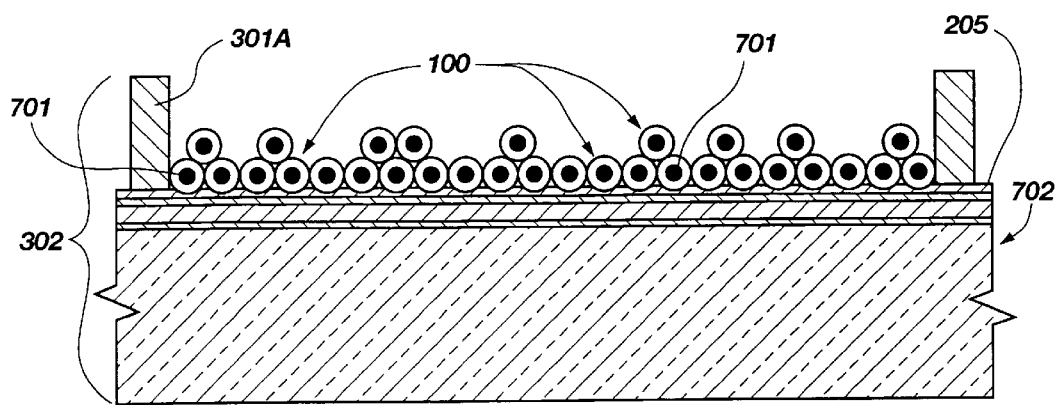
FIG. 7 is a cross-sectional side view of the in-process baseplate assembly of FIG. 5 following an elevated temperature step which causes the lower layer of beads to adhere to the thermo-adhesive layer.

Referring now to FIG. 7, once a hexagonally-packed mono-layer 701 that is in contact with the thermo-adhesive layer 203 has been attained, the temperature of in-process baseplatelwall/bead assembly 702 is elevated, causing each of the beads in the lower bead layer 701 to adhere to the thermo-adhesive layer 203.

Figure 8:
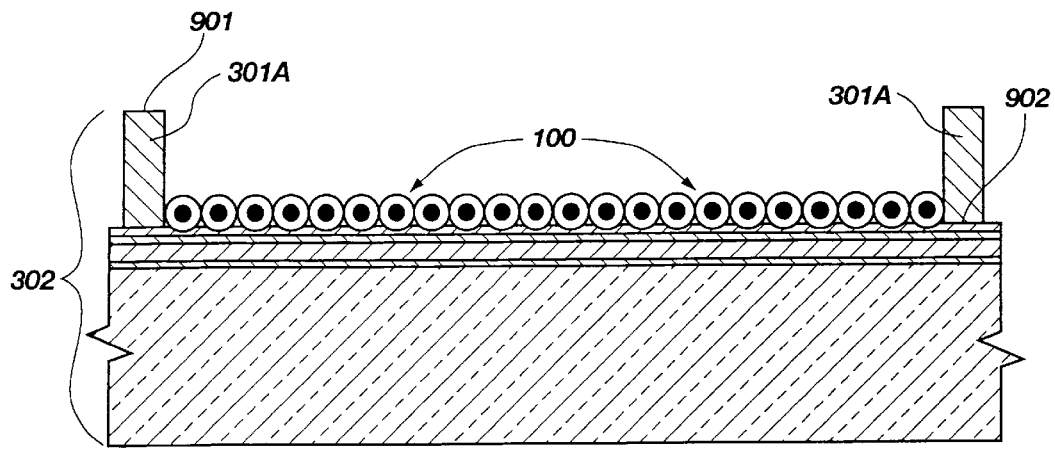
FIG. 8 is a cross-sectional side view of the in-process baseplate assembly of FIG. 7 following the discarding of unadhered beads.

Referring now to FIG. 8, once the in-process baseplate/wall/bead assembly 702 has cooled, unadhered beads (i.e., those not in lower layer 701) are discarded. This is accomplished, most easily, by inverting the assembly. They may also be removed by washing them from the assembly 702, after which the assembly 702 is dried.

Figure 9:
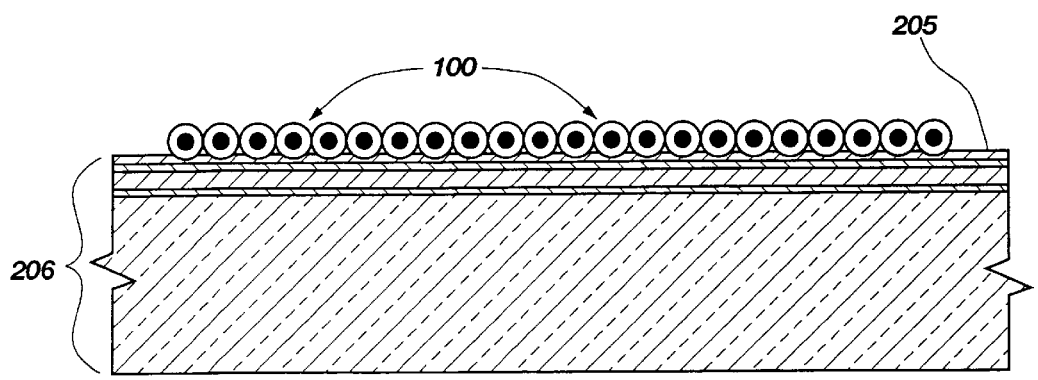
FIG. 9 is a cross-sectional side view of the in-process baseplate assembly of FIG. 8 following removal of the confinement wall.

Referring now to FIG. 9, the confinement wall 301A may be removed by applying heat to the upper edge 901 thereof, allowing the applied heat to transfer through the wall 301 until the thermo-adhesive is softened along the lower edge 902 of the wall 301 and the wall 301 can De released from the thermo-adhesive layer 203. Likewise, confinement wall 301B may be removed by releasing the spring clips 303.

Figure 10:
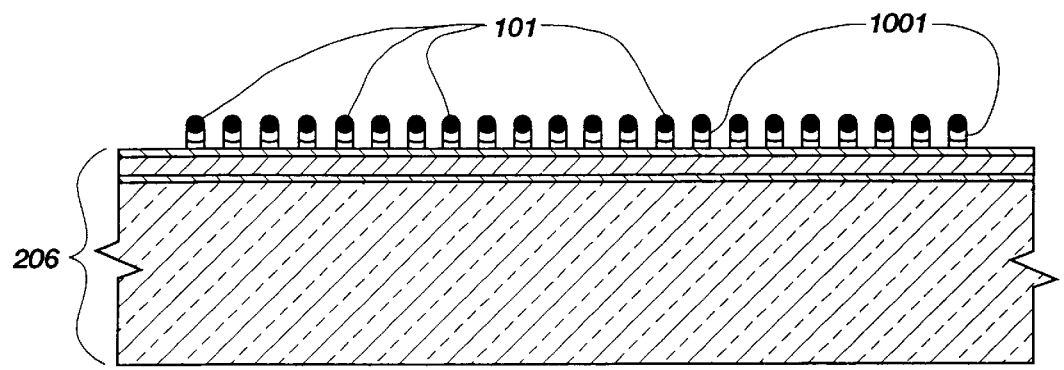
FIG. 10 is a cross-sectional side view of the in-process baseplate assembly of FIG. 9 following a first plasma etch step which removes all spacer material from the beads except that which is immediately beneath each core.

Referring now to FIG. 10, a first anisotropic etch is used to remove all spacer material 102 from the beads 100 except that which is beneath each core 101. The first anisotropic etch chemistry is selected such that neither the cores 101 nor the masking layer 204 is etched by the first plasma etch.

Figure 11:
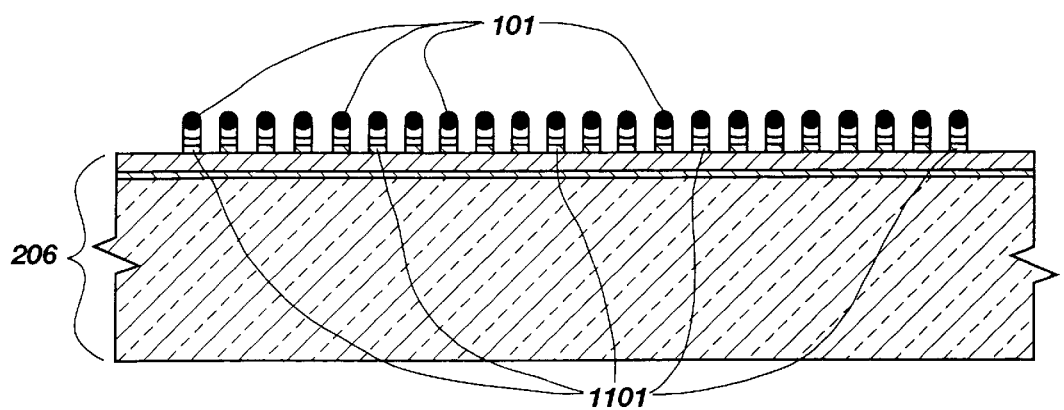
FIG. 11 is a cross-sectional side view of the in-process baseplate assembly of FIG. 10 following a second plasma etch step which anisotropically etches the masking layer to form a plurality of masking islands therefrom.

Referring now to FIG. 11, a second anisotropic etch is used to etch the masking layer 204 and stop on the silicon layer 203, forming a circular mask island 1101 beneath each core 101. An alternative embodiment of the process combines the first and second anisotropic etches so that the spacer material 102 is etched from the beads 100 during the same step that etches the masking layer 204. In this case, the etch chemistry should be carefully selected to stop on the upper surface of silicon layer 203.

Figure 12:
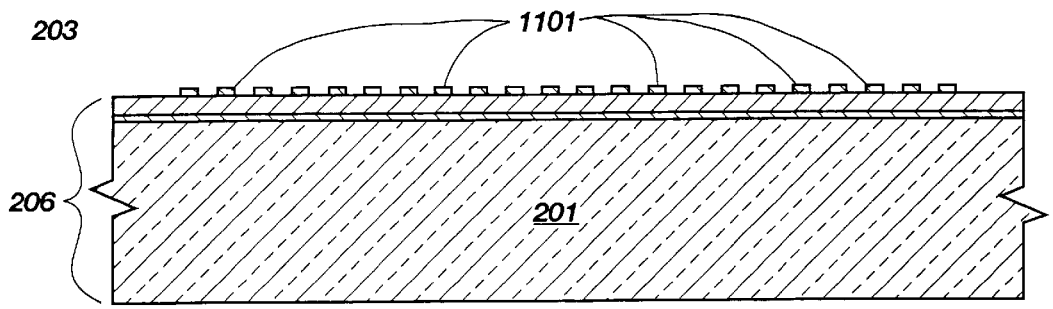
FIG. 12 is a cross-sectional side view of the in-process baseplate assembly of FIG. 11 following the removal of the cores, the spacer material which underlies each core, and remaining portions of the thermo-adhesive layer.

Referring now to FIG. 12, the remaining portions of the thermo-adhesive layer 203, the cores 101 and spacer material 102 beneath each core 101 have been removed by washing the entire substrate assembly 206 in a solvent in which the thermo-adhesive layer 205 dissolves. For wax-based thermo-adhesives, an appropriate solvent selected from the ether, alkane, alcohol and haloalkane groups may be used. For polymer resins, a ketone such as acetone may be used.

Figure 13:
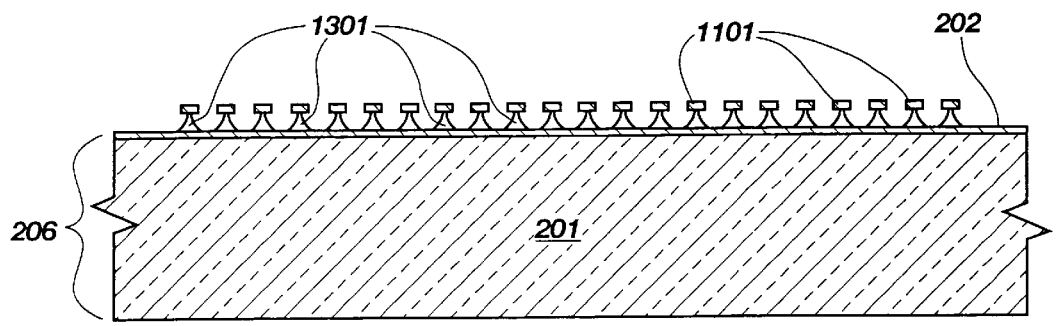
FIG. 13 is a cross-sectional side view of the in-process baseplate assembly of FIG. 12 following a first isotropic etch which forms dull micropoint cathode emitter tips within the silicon layer.

Referring now to FIG. 13, an isotropic etch is used to form an array of dull micropoint cathode emitter tips 1301 from the silicon layer 203. If the isotropic etch were continued until the tips 1301 became sharp pointed, the mask islands 1101 might become detached from the tips 1301 and interfere with etch rate uniformity.

Figure 14:
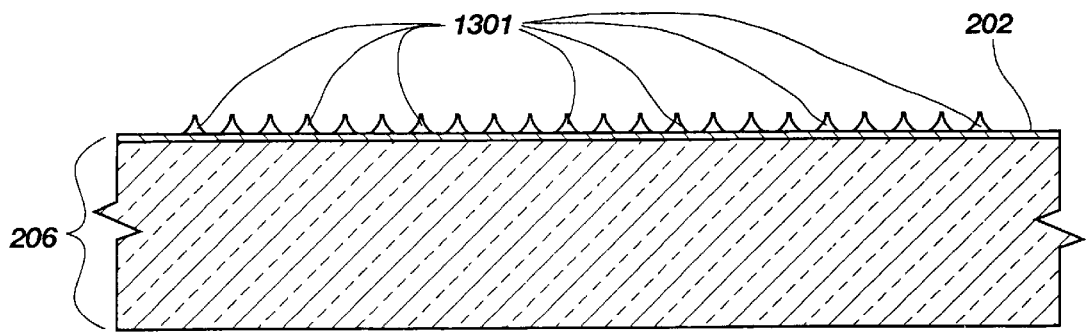
FIG. 14 is a cross-sectional side view of the in-process baseplate assembly of FIG. 13 following removal of the masking islands.

Referring now to FIG. 14, the circular mask islands 1101 are removed with an isotropic etch that is selective for the material from which the primary masking layer 204 was formed over the silicon layer 203.

Figure 15:
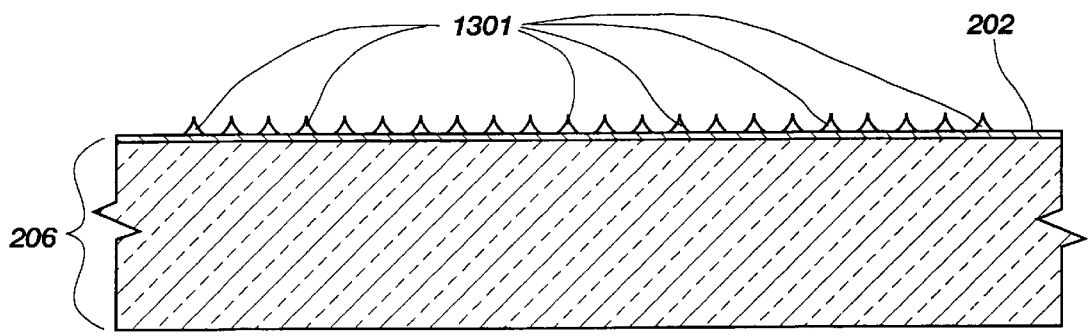
FIG. 15 is a cross-sectional side view of the inprocess baseplate assembly of FIG. 14 following a second isotropic etch which sharpens the existing dull micropoint cathode emitter tips.

Referring now to FIG. 15, the dull-pointed micropoint cathode emitter tips 1301 formed with the isotropic etch, the results of which are depicted in FIG. 13, are sharpened with a subsequent isotropic etch to form an array of sharpened micropoint cathode emitter tips 1501.

For those familiar with etching technology, it should be clear that a mask pattern formed by bead cores 101 adhered directly on the surface of the silicon layer 203 could not be used to form emitter tips, as an isotropic etch of such a structure would have resulted in a fairly constant material removal rate over the entire surface of silicon, as each core is supported (at least theoretically), by only a single point of silicon material having no area. If such a structure were isotropically etched, the cores would sink at a fairly constant rate as silicon material supporting each core was etched away. The sinking of the cores would eventually likely affect inter-core spacing. In any case, such non-differential removal rates would not produce a predictable pattern, much less an array of emitter tips. Thus, it is necessary to transfer the bead core pattern to an underlying laminar layer (i.e., masking layer 204). Each circular masking island 1101 formed from the masking layer 204 is in contact with the silicon layer 203 throughout its entire circumference. An isotropic etch of the silicon layer 203 will gradually undermine the silicon surrounding each masking island 1101 to form the pointed tip structures.

In this specification and in the appended claims, a layer which is etched using the bead cores 101 as masking elements during the etch may also be referred to as the target layer. Thus, for the previously disclosed process of forming emitter tips, the masking layer 204 is also the target layer. It is, however, conceivable that there may be a need for a final structure having a pattern such as the one which was etched into masking layer 204. Thus, for the appended claims, the target layer could be a masking layer, such as layer 204, to which the bead core pattern is transferred during a preliminary step, or it could be a layer from which a pattern of permanent structural elements such as columns or islands is anisotropically etched.

It should be evident that the heretofore described process is capable of forming an array of micropoint cathode emitter tips for a field emission display. Those having ordinary skill in the art will recognize that the process may have many other applications for creating regularly-ordered mask patterns on surfaces which are so expansive that photolithography using a conventional stepper exposure apparatus is impractical.

Although only several variations of the basic process are described, it will be obvious to those having ordinary skill in the art that changes and modifications may be made thereto without departing from the scope and the spirit of the process and products manufactured using the process as hereinafter claimed.

What is claimed is:

1. A process for masking a target layer, said process comprising the steps of:

dispensing a plurality of beads on an upper surface of said target layer, each bead having a core within a spacer shell; and removing at least a portion of the spacer shell from the core of each bead, each core thereby becoming a mask element.

2. The process of claim 1, wherein all beads of said plurality are generally spherical and of substantially uniform size, and said process further comprises the step of affixing a bead confinement wall on said upper surface, said wall preventing beads from rolling off said upper surface and facilitating packing of the beads in a regular hexagonal mono-layer pattern.

3. The process of claim 2, which further comprises the step of subjecting the bead-covered target layer to vibration in order to improve packing density of beads on said upper surface.

4. The process of claim 3, which further comprises the steps of:

applying a thermo-adhesive layer on said upper surface prior to dispensing the beads; and elevating the temperature of at least the thermo-adhesive layer after the vibration step so as to cause the beads to adhere to said thermo-adhesive layer.

5. The process of claim 1, wherein at least a portion of the spacer shell is removed from the core of each bead with an anisotropic etch.

6. The process of claim 1, which further comprises the steps of:

forming the spacer shell of each bead from a sublimable material; and removing the entire spacer shell through sublimation by elevating the ambient temperature above said upper surface.

7. A process for masking and anisotropically etching a target layer, said process comprising the steps of:

dispensing a plurality of beads on an upper surface of said target layer, each of said plurality of beads having a core within a removable shell;

removing at least a portion of the shell from the core of each bead; and anisotropically etching the target layer using the cores as an etch mask.

8. The process of claim 7 which further comprises the step of removing the cores and any remaining portions of the shells subsequent to the anisotropic etch.

9. The process of claim 8, which further comprises the step of forming a mono layer of beads over said upper surface.

10. The process of claim 9, wherein each bead and the core of each bead is generally spherical, all beads of said plurality are of substantially uniform size, and said process further comprises the step of affixing a bead confinement wall on said upper surface, said wall preventing beads from rolling off said upper surface, said wall also facilitating packing of said beads in a regular hexagonal pattern within said mono layer.

11. The process of claim 10, which further comprises the step of subjecting the bead-covered target layer to vibration in order to improve packing of beads within said mono layer.

12. The process of claim 7, which further comprises the steps of:

applying a thermo-adhesive layer on said upper surface prior to dispensing the beads; and elevating the temperature of at least the thermo-adhesive layer after the vibration step so as to cause the beads to adhere to said thermo-adhesive layer.

13. The process of claim 12, which further comprises the step of discarding all beads which have not adhered to said thermo-adhesive layer.

14. The process of claim 7, wherein removing said at least a portion of the spacer shell from the core of each bead is accomplished with an anisotropic etch.

15. The process of claim 7, which further comprises the steps of:

forming the spacer shell of each bead from a sublimable material; and removing the entire spacer shell through sublimation by elevating the ambient temperature above said upper surface.

16. A process for forming an array of micropoint cathodes for a field emission display, said process comprising the steps of:

depositing a conductive layer over a dielectric substrate;

depositing a cathodic layer over the conductive layer;

depositing a masking layer over the cathodic layer;

affixing a bead confinement wall on peripheral edges of the masking layer;

dispensing a plurality of beads over an upper surface of said masking layer within said wall, each bead having a core covered with a spacer shell;

removing at least a portion of the spacer shell from the core of each bead;

performing an anisotropic etch in order to remove portions of the masking layer which are not directly beneath each core, thereby forming masking layer islands which together constitute an etch mask overlying said cathodic layer; and isotropically etching the cathodic layer with the etch mask in place.

17. The process of claim 16, which further comprises the step of removing the cores and any remaining shell portions prior to the isotropic etch step.

18. The process of claim 16, wherein the isotropic etch is selective for the cathodic layer over the mask and the underlying conductive layer.

19. The process of claim 16, which further comprises the step of subjecting the bead-covered masking layer to vibration in order to enhance hexagonally-ordered packing of beads within said mono layer.

20. The process of claim 19, which further comprises the steps of:

applying a thermo-adhesive layer on said upper surface prior to dispensing the beads; and elevating the temperature of at least the themo-adhesive layer after the vibration step so as to cause the beads to adhere to said thermo-adhesive layer.

21. The process of claim 20, which further comprises the step of discarding all beads which have not adhered to said thermo-adhesive layer.

22. The process of claim 16, wherein all beads are generally spherical and of substantially uniform size.

23. The process of claim 22, wherein all cores are generally spherical and of substantially uniform size.

24. The process of claim 22, wherein the number of beads dispensed over said masking layer exceeds a quantity required for a hexagonally packed mono layer of beads on the entire upper surface of the thermo-adhesive layer inside the confinement wall.

25. The process of claim 16, wherein removing said at least a portion of the spacer shell from the core of each bead is accomplished with an anisotropic etch.

26. The process of claim 16, which further comprises the steps of:

forming the spacer shell of each bead from a sublimable material; and removing the entire spacer shell through sublimation by elevating the ambient temperature above said upper surface.

27. The process of claim 18, wherein said cathodic layer contains silicon.

* * * * *

UNITED STATES PATENT AND TRADEMARK OFFICE
CERTIFICATE OF CORRECTION

PATENT NO. : 6,051,149
DATED : April 18, 2000
INVENTOR(S) : Joel M. Frendt

It is certified that error appears in the above-identified patent and that said Letters Patent is hereby corrected as shown below:

Drawings,
Figure 12, delete "203", as shown on attached page.
Figure 15, change "1301" to -- 1501 --, as shown on attached page.

Column 1,
Line 58, after "evacuated," change "an" to -- a --
Line 61, change "year." to -- years --

Column 3,
Line 10, after "particles" and before "is" insert -- particles --

Column 4,
Line 65, after "promotes" and before "continuous" insert -- a --

Column 5,
Line 32, change "inprocess" to -- in-process --
Line 48, change "base plate" to -- baseplate --
Line 54, insert a comma after "example"

Column 6,
Line 37, change "sublimes" to -- sublimates --
Line 39, change "400°C." to -- 400°C.). --
Line 39, change "Paradichlorbenzene" to -- Paradichlorobenzene --
Line 67, after "thermo-adhesive" delete "to"

Column 7,
Lines 11, 17, 18, 21, 23, 47, 54 and 57, change "203" to -- 205 --
Lines 20 and 67, change "301" to -- 301A --
Line 27, change "301A" to -- 301B --
Line 36, change "have" to -- has --
Lines 37 and 43, change "baseplate" to -- baseplate/wall --
Line 55, change "baseplatelwall/bead" to -- baseplate/wall/bead --

Column 8,
Line 2, change "301" (both occurrences) to -- 301A --
Line 2, change "De" to -- be --
Lines 3 and 20, change "203" to -- 205 --
Line 6, after "material" and before "102" insert -- shell --
Line 21, before "102" insert -- shell --
Line 22, change "substrate" to -- baseplate --
Line 49, delete the comma after "theoretically)"

UNITED STATES PATENT AND TRADEMARK OFFICE
CERTIFICATE OF CORRECTION

PATENT NO.  : 6,051,149
DATED       : April 18, 2000
INVENTOR(S) : Joel M. Frendt It is certified that error appears in the above-identified patent and that said Letters Patent is hereby corrected as shown below:

Column 9,
Line 29, after "bead" insert -- of said plurality --
Line 37, after "surface" and before the comma insert -- of said target layer --
Line 42, after "bead-covered" and before "target" insert -- upper surface of said --
Line 49, after "elevating" change "the" to -- a --
Line 60, after "above" and before "said" insert -- a temperature of --

Column 10,
Line 5, insert a comma after "7"
Line 20, change "bead-covered target layer" to -- mono-layer of beads --
Line 22, change "7" to -- 11 --
Line 40, after "above" and before "said" insert -- a temperature of --
Line 66, after "the" and before "mask" insert -- etch --

Column 11,
Line 2, after "bead-covered" and before "masking" insert -- upper surface of said --
Line 4, change "mono" to -- masking --
Line 7, after "surface" insert -- of said masking layer --
Line 9, after "elevating" change "the" to -- a --

Column 12,
Line 1, after "wherein" change "the" to -- a --
Line 2, after "over" and before "said" insert -- the upper surface of --
Line 3, change "mono layer" to -- mono-layer --
Line 4, change "thermo-adhesive" to -- masking --
Line 14, after "above" and before "said" insert -- a temperature of --

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,051,149
DATED : April 18, 2000
INVENTOR(S) : Joel M. Frendt

It is certified that error appears in the above-identified patent and that said Letters Patent is hereby corrected as shown below:

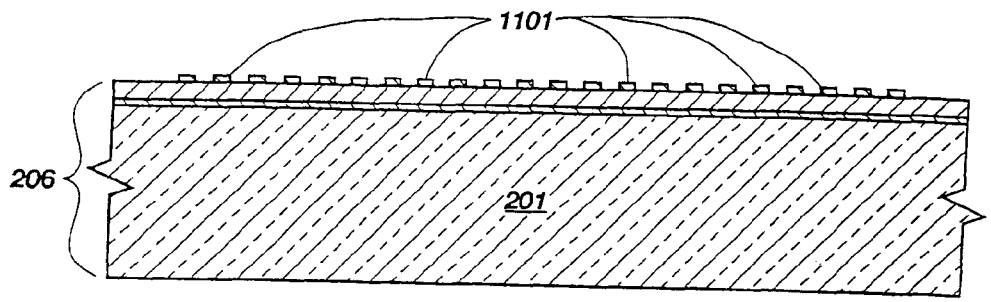

Fig. 12

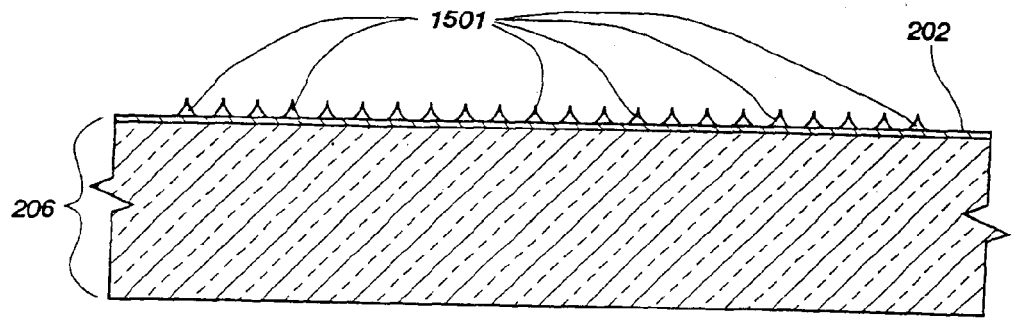

Fig. 15